(12) United States Patent
Hirabayashi et al.

(10) Patent No.: US 9,606,981 B2
(45) Date of Patent: Mar. 28, 2017

(54) ELECTRONIC APPARATUS AND METHOD

(71) Applicant: Kabushiki Kaisha Toshiba, Minato-ku, Tokyo (JP)

(72) Inventors: Hirotada Hirabayashi, Hamura (JP); Yukihiro Kurita, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 292 days.

(21) Appl. No.: 14/286,727

(22) Filed: May 23, 2014

(65) Prior Publication Data
US 2015/0135065 A1 May 14, 2015

(30) Foreign Application Priority Data

Nov. 8, 2013 (JP) .................................. 2013-232262

(51) Int. Cl.

| | |
|---|---|
| G06F 3/00 | (2006.01) |
| G06F 17/27 | (2006.01) |
| G06F 3/023 | (2006.01) |
| G06K 9/00 | (2006.01) |
| G06F 3/0488 | (2013.01) |
| G06K 9/72 | (2006.01) |

(52) U.S. Cl.
CPC .......... *G06F 17/276* (2013.01); *G06F 3/0237* (2013.01); *G06F 3/04883* (2013.01); *G06K 9/00422* (2013.01); *G06K 9/723* (2013.01); *G06K 2209/01* (2013.01)

(58) Field of Classification Search
CPC ................................. G06F 3/023; G06F 17/27
See application file for complete search history.

(56) References Cited

U.S. PATENT DOCUMENTS

| | | |
|---|---|---|
| 5,698,822 A | 12/1997 | Haneda et al. |
| 7,466,859 B2 | 12/2008 | Chang et al. |
| | (Continued) | |

FOREIGN PATENT DOCUMENTS

| | | |
|---|---|---|
| JP | H06-251187 A | 9/1994 |
| JP | H07-121662 A | 5/1995 |
| | (Continued) | |

OTHER PUBLICATIONS

The extended European search report issued by European Patent Office on Mar. 13, 2015 in the corresponding European patent application No. 14166091.0—9 pages.

(Continued)

*Primary Examiner* — Stephen Hong
*Assistant Examiner* — Marshon Robinson
(74) *Attorney, Agent, or Firm* — Knobbe, Martens, Olson & Bear LLP

(57) ABSTRACT

According to one embodiment, an electronic apparatus includes a display processor. The display processor is configured to display one or more first strokes on a screen. The display processor is configured to display a plurality of candidates each indicative of one or more handwritten characters in a handwritten document, the plurality of candidates retrieved from the handwritten document by using the one or more first strokes, and is configured to arrange the plurality of candidates in an order determined by using number of strokes of each of the plurality of candidates and to display the plurality of arranged candidates.

12 Claims, 14 Drawing Sheets

(56) References Cited

U.S. PATENT DOCUMENTS

| | | | |
|---|---|---|---|
| 7,865,018 B2 | 1/2011 | Abdulkader et al. | |
| 8,918,408 B2 | 12/2014 | Ohtsuki et al. | |
| 2005/0249419 A1 | 11/2005 | Rieman | |
| 2006/0188162 A1* | 8/2006 | Szilagyi | G06F 8/70 |
| | | | 382/226 |
| 2008/0042978 A1* | 2/2008 | Perez-Noguera | G06F 3/0202 |
| | | | 345/168 |
| 2009/0174667 A1 | 7/2009 | Kocienda et al. | |
| 2009/0226091 A1* | 9/2009 | Goldsmith | G06K 9/00436 |
| | | | 382/189 |
| 2011/0040908 A1 | 2/2011 | Ikeda et al. | |
| 2012/0139859 A1 | 6/2012 | Ohira et al. | |
| 2012/0299701 A1 | 11/2012 | Zou et al. | |
| 2015/0035765 A1 | 2/2015 | Hirabayashi | |
| 2015/0242114 A1 | 8/2015 | Hirabayashi et al. | |
| 2015/0278216 A1 | 10/2015 | Hirabayashi | |

FOREIGN PATENT DOCUMENTS

| | | |
|---|---|---|
| JP | H07-311817 A | 11/1995 |
| JP | 09-120433 A | 5/1997 |
| JP | H09-319504 A | 12/1997 |
| JP | 10-171589 A | 6/1998 |
| JP | 2000-187658 A | 7/2000 |
| JP | 2000-215270 A | 8/2000 |
| JP | 2000-348141 A | 12/2000 |
| JP | 2005-025566 A | 1/2005 |
| JP | 2005-190199 A | 7/2005 |
| JP | 2007-213416 A | 8/2007 |
| JP | 2007-265171 A | 10/2007 |
| JP | 2008-186056 A | 8/2008 |
| JP | 2009-146273 A | 7/2009 |
| JP | 2009-223430 A | 10/2009 |
| JP | 2012-098891 A | 5/2012 |
| JP | 5813780 B | 10/2015 |
| WO | WO 2005/004041 A1 | 1/2005 |
| WO | WO 2007/094078 A1 | 8/2007 |
| WO | WO 2011/079417 A1 | 7/2011 |
| WO | WO 2015/015644 A1 | 2/2015 |

OTHER PUBLICATIONS

U.S. Appl. No. 14/268,777, filed May 2, 2014, Electronic Apparatus, Method and Storage Medium.

U.S. Appl. No. 14/547,999, filed Nov. 19, 2014, Electronic Device, Method and Computer Readable Medium.

U.S. Appl. No. 14/576,728, filed Dec. 19, 2014, Electronic Device, Method and Computer Program Product.

First Office Action mailed by Japan Patent Office on Sep. 9, 2014 in the corresponding Japanese Patent Application No. 2013-544612—7 pages.

Decision of Rejection mailed by Japan Patent Office on Feb. 17, 2015 in Japanese Patent Application No. 2013-544612—6 pages.

International Search Report mailed by Japan Patent Office on Aug. 27, 2013 in the corresponding PCT application No. PCT/JP2013/071041—9 pages.

U.S. Appl. No. 14/268,777, filed May 2, 2014, Kurita.

* cited by examiner

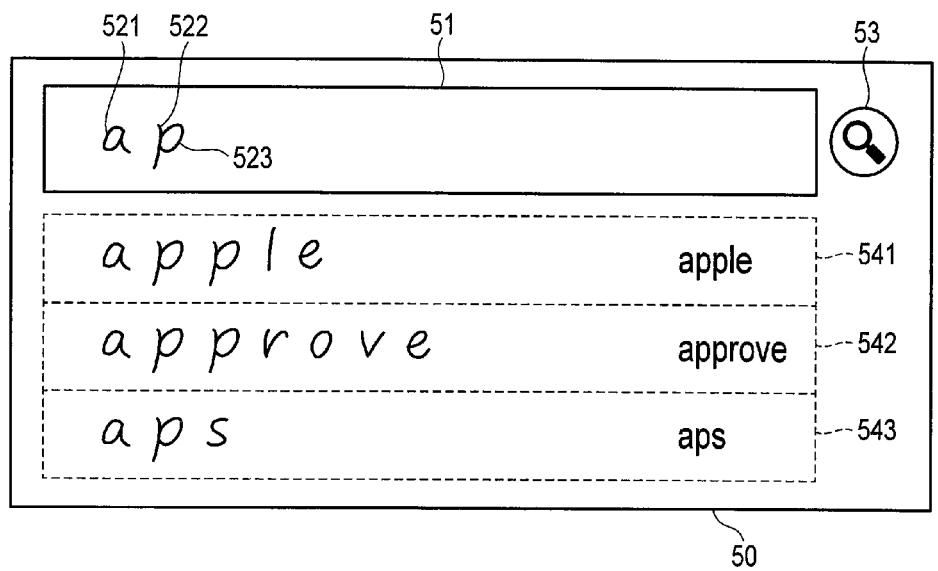
F I G. 5
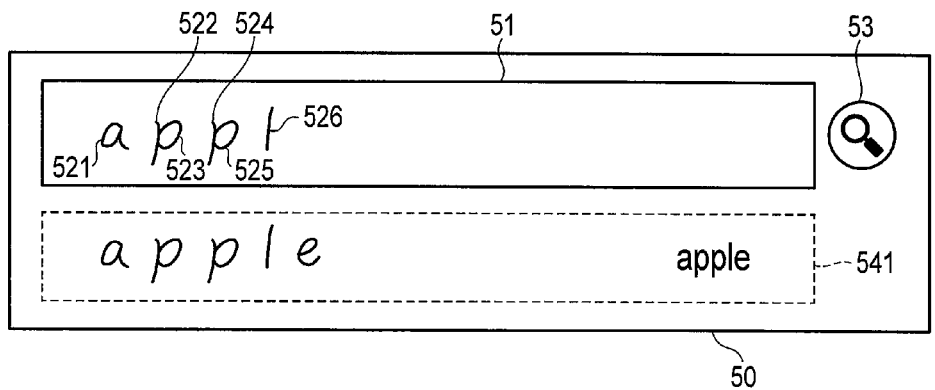
F I G. 6

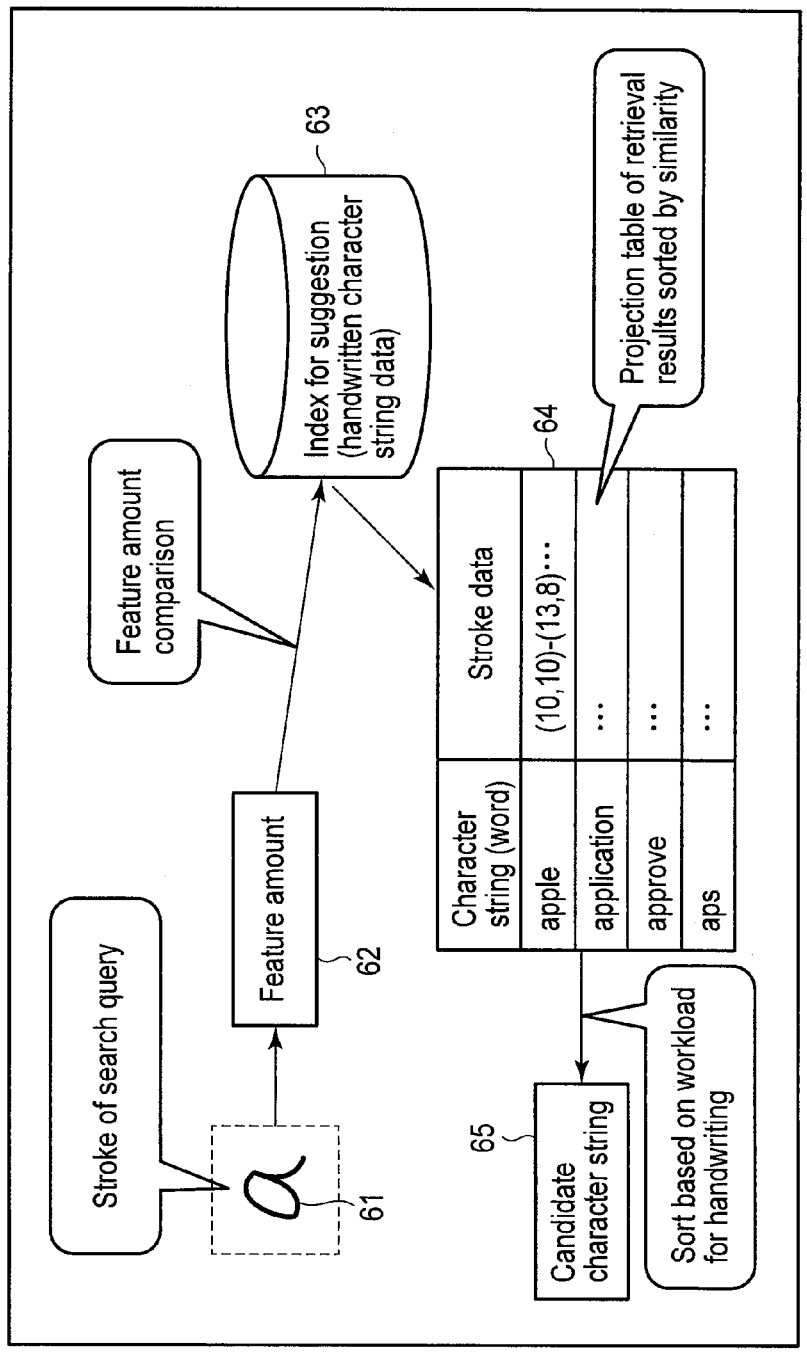
F I G. 7

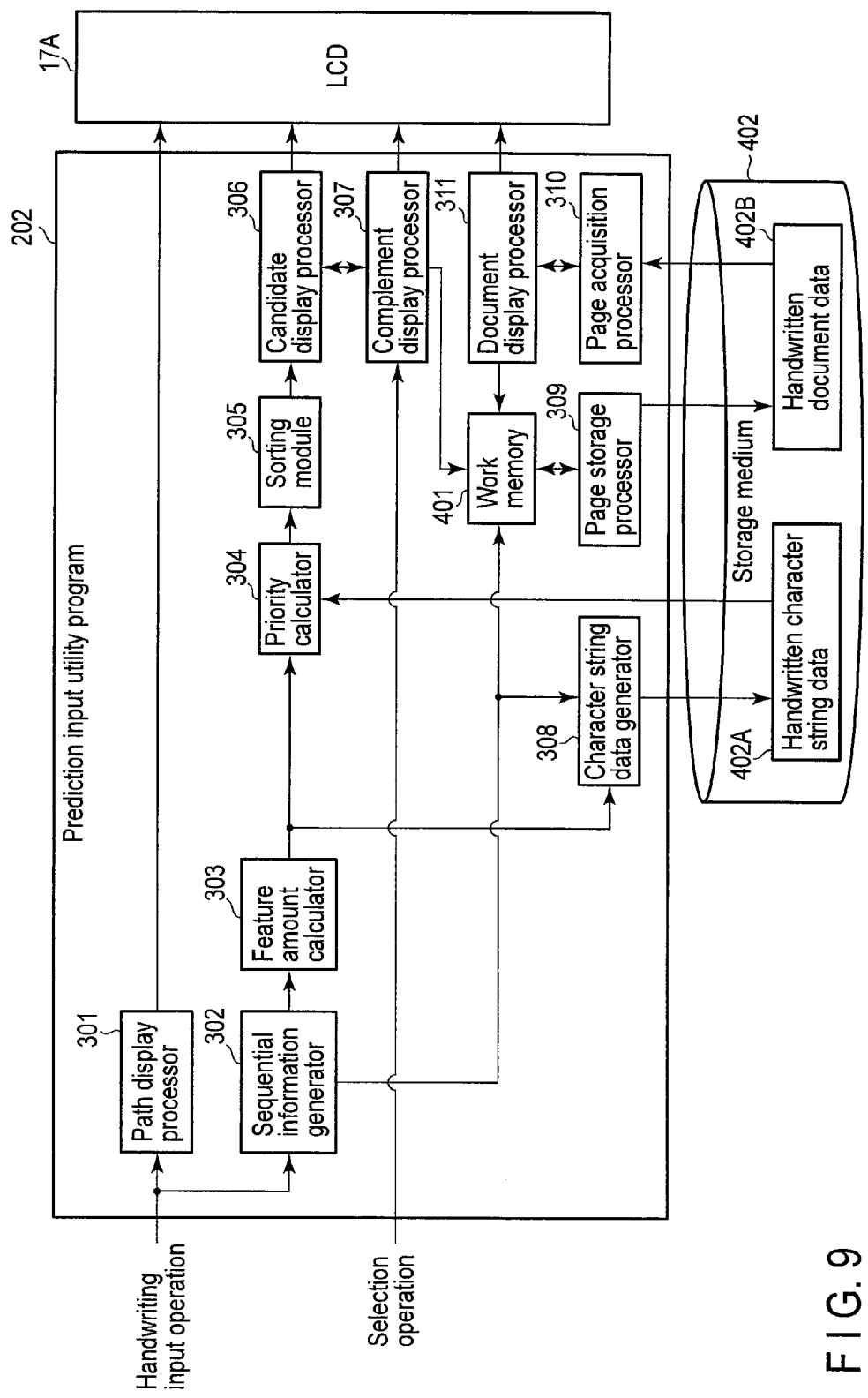
F I G. 9

| Character string | Feature amount | Stroke data | ... |
|---|---|---|---|
| apple | 123456,1235··· | (10,10)-(13,8)-··· | ... |
| approve | ... | ... | ... |
| application | ... | ... | ... |
| aps | ... | ... | ... |
| ... | ... | ... | ... |

F I G. 1 0

| Ranking | Character string | Similarity |
|---|---|---|
| 1 | apple | 6 |
| 2 | approve | 6 |
| 3 | application | 6 |
| 4 | apply | 6 |
| 5 | aps | 3 |
| 6 | apricot | 3 |
| ... | ... | ... |

A plurality of character strings having the same similarity are sorted according to detection order, storage order, and the like.

F I G. 1 1

| Ranking | Character string | Similarity | Number of strokes |
|---|---|---|---|
| 1 | application | 6 | 14 |
| 2 | approve | 6 | 7 |
| 3 | apply | 6 | 6 |
| 4 | apple | 6 | 5 |
| ... | ... | ... | ... |

A plurality of character strings having the same similarity are arranged in descending order of the number of strokes.

F I G. 1 2

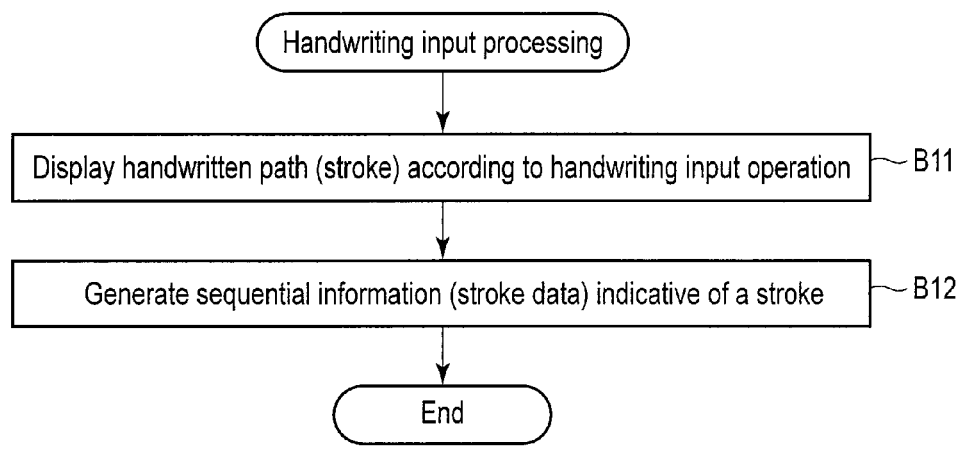
F I G. 1 8

ELECTRONIC APPARATUS AND METHOD

CROSS-REFERENCE TO RELATED APPLICATIONS

This application is based upon and claims the benefit of priority from Japanese Patent Application No. 2013-232262, filed Nov. 8, 2013, the entire contents of which are incorporated herein by reference.

FIELD

Embodiments described herein relate generally to a technique of inputting character strings by handwriting.

BACKGROUND

In recent years, various electronic apparatuses such as tablet computers, PDAs, smartphones, and the like have been developed. Most of the electronic apparatuses of this kind are provided with touch screen displays to facilitate input operations carried out by users, and some of them support handwriting. Accordingly, a user can create a document including not only text and images, but also handwriting character strings and freehand drawings by using the electronic apparatus.

In the meantime, there is a method for assisting the user to input character strings by using a history of character strings that have been already input when the user is to input a character string such as a word or the like.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 5 is a view showing an example in which candidate character strings by predictive input are displayed on a search screen to which a keyword is to be input by handwriting.

FIG. 6 is a view showing an example in which strokes constituting the keyword are further handwritten on the search screen of FIG. 5.

FIG. 7 is an exemplary conceptual view for explaining acquisition of candidate character strings for predictive input by the electronic apparatus of the embodiment.

FIG. 9 is an exemplary block diagram showing the functional configuration of a predictive input utility program executed by the electronic apparatus of the embodiment.

FIG. 10 is a view showing a configuration example of handwritten character string data to be used by the electronic apparatus of the embodiment.

FIG. 11 is a view showing an example in which handwritten character strings in the order of the degree of similarity are acquired by the electronic apparatus of the embodiment from the handwritten character string data of FIG. 10 based on handwritten strokes constituting a character string being input.

FIG. 12 is a view showing an example in which the handwritten character strings in the order of the degree of similarity of FIG. 11 are rearranged by the electronic apparatus of the embodiment based on the number of strokes constituting the character string.

FIG. 18 is a flowchart showing an example of the procedure of handwriting input processing executed by the electronic apparatus of the embodiment.

DETAILED DESCRIPTION

Various embodiments will be described hereinafter with reference to the accompanying drawings.

In general, according to one embodiment, an electronic apparatus includes a display processor. The display processor is configured to display one or more first strokes on a screen. The display processor is configured to display a plurality of candidates each indicative of one or more handwritten characters in a handwritten document, the plurality of candidates retrieved from the handwritten document by using the one or more first strokes, and is configured to arrange the plurality of candidates in an order determined by using number of strokes of each of the plurality of candidates and to display the plurality of arranged candidates.

Figure 1:
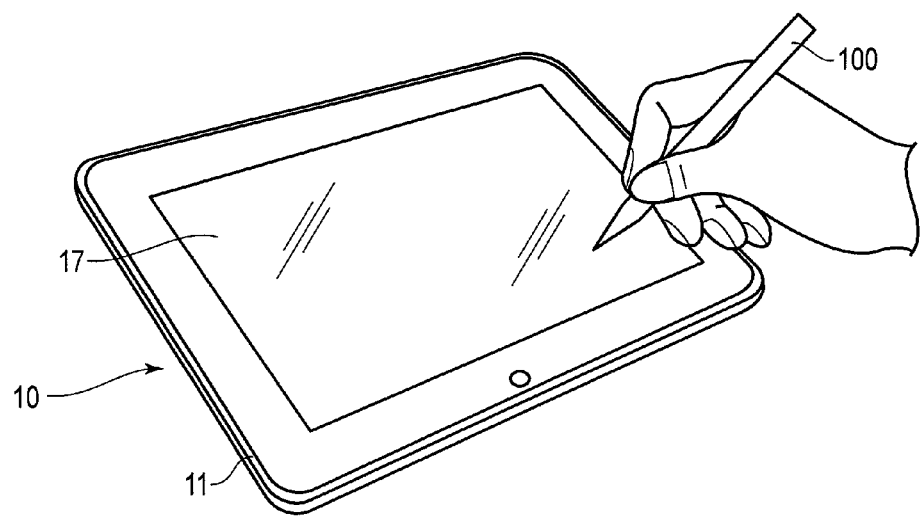
FIG. 1 is an exemplary perspective view showing an external view of an electronic apparatus according to an embodiment.

FIG. 1 is a perspective view showing an external view of an electronic apparatus according to an embodiment. This electronic apparatus is, for example, a stylus-based portable electronic apparatus enabling handwriting input carried out by using a stylus (pen) or a finger. This electronic apparatus may be realized as a tablet computer, notebook computer, smartphone, PDA, and the like. In the following description, a case where the electronic apparatus is realized as a tablet computer 10 is assumed. The tablet computer 10 is a portable electronic apparatus also called a tablet or a slate computer. As shown in FIG. 1, the tablet computer 10 includes a main unit 11 and a touch screen display 17. The touch screen display 17 is attached to the main unit 11, superposed on the upper surface of the main unit 11.

The main body 11 has a thin box-shaped housing. In the touch screen display 17, a flat-panel display, and a sensor configured to detect a contact position of a stylus or a finger on the screen of the flat-panel display are incorporated. The flat-panel display may be, for example, a liquid crystal display (LCD). As the sensor, for example, a capacitive touch panel, electromagnetic induction digitizer, and the like may be used. In the following description, a case where both the two types of sensors including a digitizer, and touch panel are incorporated in the touch screen display 17 is assumed.

Each of the digitizer and touch panel is provided to cover the screen of the flat-panel display. This touch screen display 17 may detect not only a touch operation on the screen using a finger, but also a touch operation on the screen using a stylus 100. The stylus 100 is, for example, an electromagnetic induction stylus.

The user can carry out a handwriting input operation of inputting a plurality of strokes by handwriting on the touch screen display 17 by using an external object (stylus 100 or finger). During the handwriting input operation, a path of the movement of the external object (stylus 100 or finger) on the screen, i.e., a path of a stroke handwritten by a handwriting input operation is drawn in real time, whereby a path of each stroke is displayed on the screen. A path of the movement of the external object during a period during which the external object is kept in contact with the screen corresponds to one stroke. A set of a large number of strokes, i.e., a set of a large number of paths constitutes a handwritten character or a figure.

In this embodiment, such handwritten strokes (handwritten character and figure) are stored in a storage medium not as image data, but as sequential information (stroke data) indicative of coordinates of paths of the strokes and an order relation of the strokes. Although details of the sequential information will be described later with reference to FIG. 3, the sequential information broadly implies a set of sequential stroke data corresponding to a plurality of strokes. Each of the stroke data may be arbitrary if only the data is capable of expressing a certain stroke input by handwriting, and includes, for example, a coordinate data series (sequential coordinates) corresponding to points on a path of the stroke. The order of arrangement of the stroke data corresponds to the order in which the strokes have been handwritten, i.e., the stroke order.

The tablet computer 10 may read arbitrary existing document data from the storage medium, and display a document corresponding to the document data, i.e., a handwritten document in which paths corresponding to a plurality of strokes indicated by the sequential information on the screen.

Figure 2:
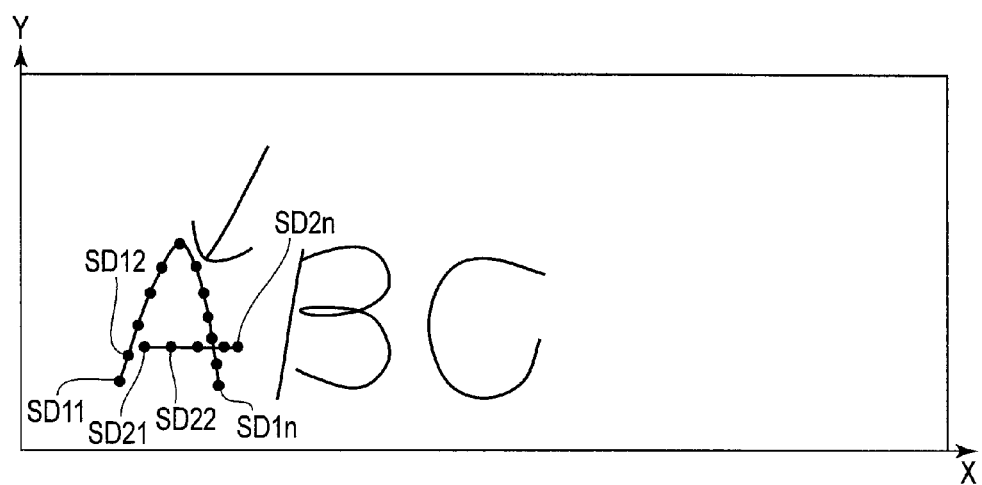
FIG. 2 is a view showing an example of strokes handwritten on a touch screen display of the electronic apparatus of the embodiment.

Next, a relationship between strokes handwritten by the user (e.g. handwritten character, mark, figure, table, and the like), and sequential information will be described below with reference to FIGS. 2, and 3. FIG. 2 shows an example of a document handwritten on the touch screen display 17 by using the stylus 100 or the like.

In this document, there are many cases where on a character or a figure once handwritten, another character or a figure is further handwritten. In FIG. 2, a case where a handwritten character string "ABC" is handwritten in the order of "A", "B", and "C", and thereafter a handwritten arrow is handwritten in the immediate vicinity of the handwritten character "A" is assumed.

The handwritten character "A" is expressed by two strokes (a path of "Λ" shape, and a path of "-" shape) handwritten by using the stylus 100 or the like, i.e., by two paths. The path of the stylus 100 of the first handwritten "Λ" shape is sampled in real time, for example, at regular intervals, whereby sequential coordinates SD11, SD12, . . . , SD1n of the stroke of the "Λ" shape are obtained. Likewise, the path of the stylus 100 of the next handwritten "-" shape is also sampled, whereby sequential coordinates SD21, SD22, . . . , SD2n of the stroke of the "-" shape are obtained.

The handwritten character "B" is expressed by two strokes handwritten by using the stylus 100 or the like, i.e., by two paths. The handwritten character "C" is expressed by one stroke handwritten by using the stylus 100 or the like, i.e., by one path. The handwritten arrow is expressed by two strokes handwritten by using the stylus 100 or the like, i.e., by two paths.

Figure 3:
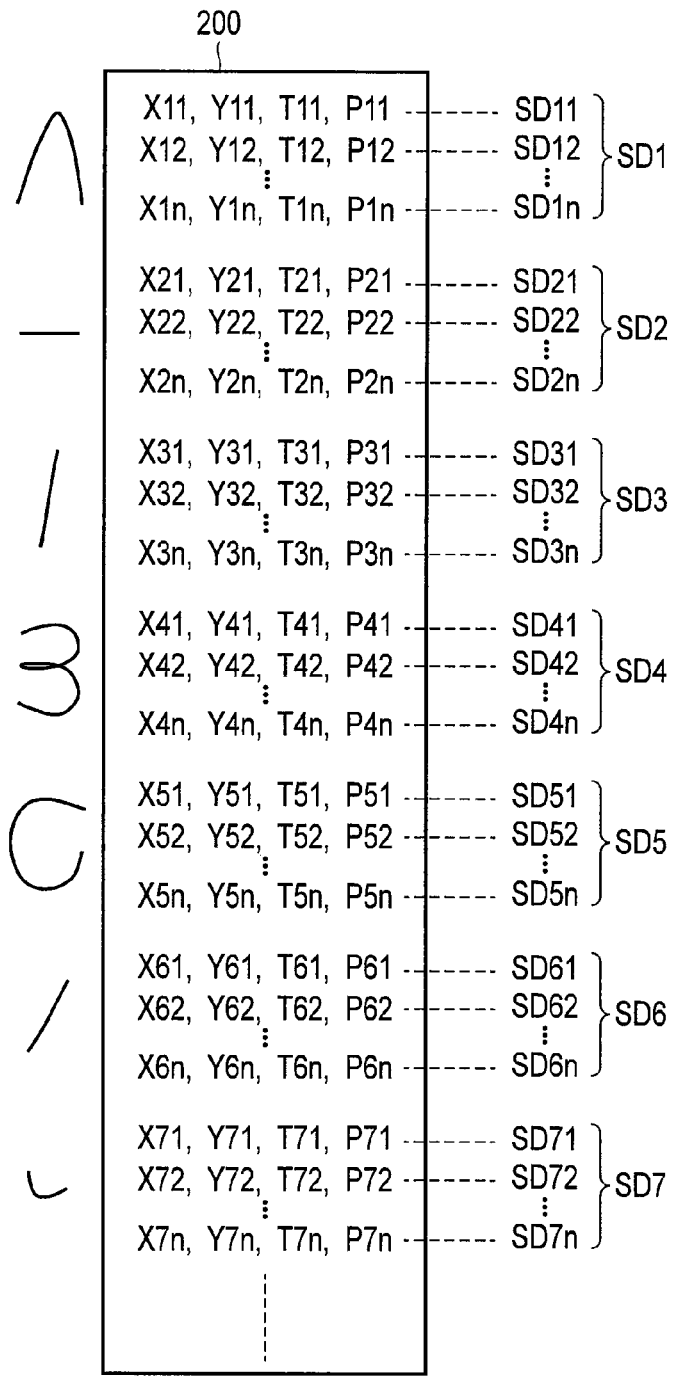
FIG. 3 is an exemplary view for explaining sequential information (stroke data) corresponding to the handwritten strokes of FIG. 2, and stored in a storage medium by the electronic apparatus of the embodiment.

FIG. 3 shows sequential information 200 corresponding to the document of FIG. 2. The sequential information 200 includes a plurality of stroke data SD1, SD2, . . . , SD7. In the sequential information 200, the stroke data SD1, SD2, . . . , SD7 are arranged in time series in the stroke order, i.e., in the order in which the plurality of strokes were handwritten.

In the sequential information 200, the first two stroke data SD1, and SD2 are indicative of two strokes of the handwritten character "A". The third and fourth stroke data SD3, and SD4 are indicative of two strokes of the handwritten character "B". The fifth stroke data SD5 is indicative of one stroke of the handwritten character "C". The sixth and seventh stroke data SD6, and SD7 are indicative of two strokes of the handwritten arrow.

Each stroke data includes a coordinate data series (sequential coordinates) corresponding to one stroke, i.e., a plurality of coordinates corresponding to a plurality of points on a path of one stroke. In each stroke data, a plurality of coordinates are arranged in time series in the order in which the stroke is written. For example, regarding the handwritten character "A", the stroke data SD1 includes a coordinate data series (sequential coordinates) corresponding to the points on the path of the stroke of the "Λ" shape of the handwritten character "A", i.e., an n-number of coordinate data SD11, D12, . . . , SD1n. The stroke data item SD2 includes a coordinate data series corresponding to the points on the path of the stroke of the "-" shape of the handwritten character "A", i.e., an n-number of coordinate data SD21, SD22, . . . , SD2n. Incidentally, the number of coordinate data may differ between respective stroke data.

Each coordinate data is indicative of an x-coordinate and a y-coordinate which correspond to one point in the associated path. For example, the coordinate data SD11 is indicative of an x-coordinate (X11) and y-coordinate (Y11) of a starting point of the stroke of the "Λ" shape. The coordinate data item SD1n is indicative of an x-coordinate (X1n) and y-coordinate (Y1n) of an ending point of the stroke of the "Λ" stroke.

Further, each coordinate data may include time stamp information T corresponding to a time point at which the point corresponding to the coordinates has been handwritten. The time point at which the point has been handwritten may be either the absolute time (for example, sec., min., time, month, day, and year) or relative time with reference to a certain time point. For example, the absolute time (for example, sec., min., time, month, day, and year) at which handwriting of a stroke has been started may be added as time stamp information to each stroke data and, furthermore relative time indicative of a difference from the absolute time may be added to each coordinate data in the stroke data as time stamp information T. By using the sequential information in which the time stamp information T is added to each coordinate data, a temporal relationship between strokes can be more precisely expressed.

Furthermore, each coordinate data may include the pressure P caused by the external object (for example, the stylus 100) brought into contact with the screen at the time point at which the point corresponding to the coordinates has been handwritten.

In this embodiment, as described above, the handwritten stroke is stored not as an image or a character recognition result, but as sequential information 200 constituted of a set of sequential stroke data. Thus, handwritten characters and figures can be handled, without depending on languages. Accordingly, the structure of the sequential information 200 of this embodiment may be used in common in various countries in the world different in language used.

Figure 4:
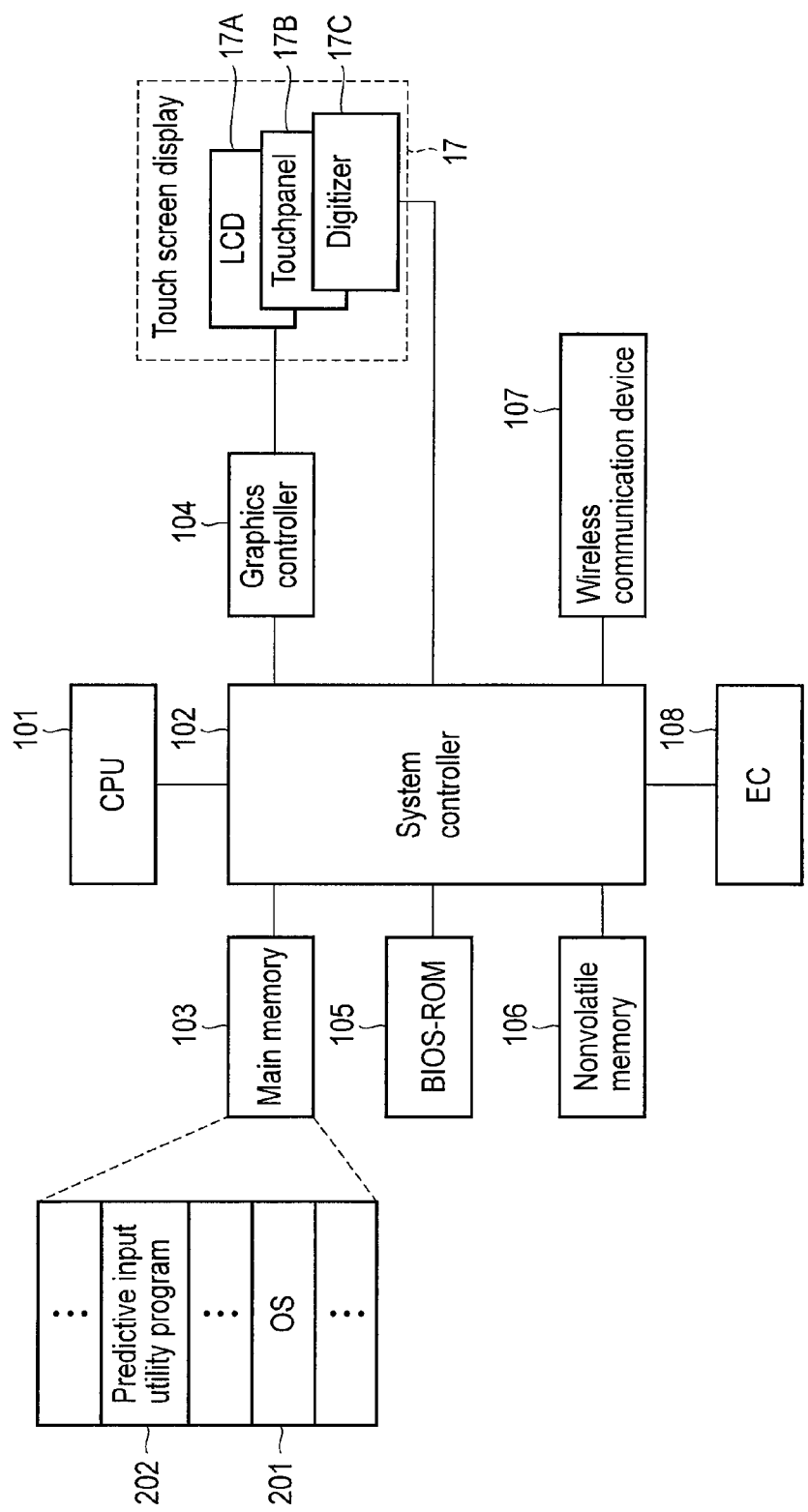
FIG. 4 is an exemplary block diagram showing the system configuration of the electronic apparatus of the embodiment.

FIG. 4 shows the system configuration of the tablet computer 10.

As shown in FIG. 4, the tablet computer 10 includes a CPU 101, a system controller 102, a main memory 103, a graphics controller 104, a BIOS-ROM 105, a nonvolatile memory 106, a wireless communication device 107, an embedded controller (EC) 108, and the like.

The CPU 101 is a processor configured to control operations of various components in the tablet computer 10. The CPU 101 executes various types of software to be loaded from the nonvolatile memory 106 serving as a storage device into the main memory 103. The software includes an operating system (OS) 201, and various application programs. The application programs include a predictive input utility program 202. This predictive input utility program 202 includes a predictive input function (suggestion function) of presenting candidates for a character string predicted to be input based on one or more strokes input by handwriting. The predictive input utility program 202 realizes, for example, a suggestion function of a search keyword, complementing function of character strings to be input to a document, and the like by the predictive input function.

Further, the CPU 101 also executes a basic input/output system (BIOS) stored in the BIOS-ROM 105. The BIOS is a program for hardware control.

The system controller 102 is a device which connects a local bus of the CPU 101, and various components. The system controller 102 includes a memory controller which access-controls the main memory 103. Further, the system controller 102 includes a function of executing communication with the graphics controller 104 via, e.g. a PCI EXPRESS serial bus.

The graphics controller 104 is a display controller which controls an LCD 17A used as a display monitor of the tablet computer 10. A display signal generated by the graphics controller 104 is sent to the LCD 17A. The LCD 17A displays a screen image based on the display signal. A touch panel 17B, and digitizer 17C are arranged on the LCD 17A. The touch panel 17B is a capacitive pointing device which carries out input on the screen of the LCD 17A. The touch panel 17B detects a contact position on the screen, which is touched by a finger, and the movement of the contact position. The digitizer 17C is an electromagnetic induction pointing device which carries out an input on the screen of the LCD 17A. The digitizer 17C detects a contact position on the screen, which is touched by the stylus 100, and a movement of the contact position.

The wireless communication device 107 is a device configured to execute wireless communication of a wireless LAN or 3G mobile communication. The EC 108 is a one-chip microcomputer including an embedded controller for power management. The EC 108 includes a function of turning on or turning off the power to the tablet computer 10 according to an operation of a power button by the user.

As described above, the predictive input utility program 202 realizes by using the predictive input function, a suggestion function of a search keyword, complementing function of character strings to be input to a document, and the like.

FIG. 5 shows an example in which candidate character strings are displayed by the suggestion function on a search screen 50 to which a keyword is inputting by handwriting. The retrieval using the search screen 50 may be any one of various types of retrieval based on a keyword, and may be, for example, retrieval of a corresponding part in a document, file retrieval, web retrieval, and the like. Here, a case where the user is to carry out retrieval based on a word "apple" is assumed.

The search screen 50 includes, for example, a keyword input area 51, a search button 53, and candidate character strings 541, 542, and 543. The keyword input area 51 is an area to which strokes constituting a character string (keyword) are input by handwriting by using the touch screen display 17. The search button 53 is a button for instructing to execute retrieval based on the keyword input to the keyword input area 51. The candidate character strings 541, 542, and 543 are buttons indicative of candidate character strings predicted to be input based on the character string input to the keyword input area 51 by handwriting.

More specifically, when a handwritten character string "ap" is input to the keyword input area 51, i.e., when strokes 521, 522, and 523 are input by handwriting, the candidate character strings 541, 542, and 543 predicted to be input are displayed on the search screen 50 based on the handwritten character string "ap". These candidate character strings 541, 542, and 543 are, for example, character strings (handwritten character strings) "apple", "approve", and "aps" starting with "ap". If these candidate character strings 541, 542, and 543 includes a character string which the user intends to input, the user selects the candidate character string (presses a button of the candidate character string), whereby the user can instruct to draw the selected candidate character string on the keyword input area 51.

If any candidate character string is selected from the candidate character strings 541, 542, and 543, the selected candidate character string is displayed on the keyword input area 51. That is, the strokes 521, 522, and 523 which have already been input are replaced with one or more strokes corresponding to the selected candidate character string. Further, by pressing the search button 53, the user can instruct to execute retrieval using the handwritten character string (i.e., the selected candidate character string) in the keyword input area 51 as a keyword.

On the other hand, if the candidate character strings 541, 542, and 543 do not include character string which the user intends to input, the user further inputs characters (strokes) constituting the keyword to the keyword input area 51 by handwriting.

As shown in FIG. 6, when a handwritten character string "pl" is further input to the keyword input area 51, i.e., when strokes 524, 525, and 526 are further input by handwriting, a candidate character string 541 predicted to be input is displayed on the search screen 50 based on the handwritten character string "appl". That is, in accordance with the further handwriting of the character string "pl" carried out after the handwriting of the character string "ap", the candidate character strings to be displayed are updated. By this update, the candidate character strings 542, and 543 not including the character string "pl" are deleted from the screen, and only the candidate character string "apple" 541 starting with a character string "appl" is displayed on the screen. The candidate character string is updated, for example, each time one stroke is handwritten. If the candidate character string 541 is the character string which the user intends to input, the user can instruct to draw the candidate character string 541 on the keyword input area 51 by selecting the candidate character string 541.

It should be noted that in the example shown in FIG. 5, the plurality of candidate character strings 541, 542, and 543 are displayed for the handwritten character string "ap" which has been input to the keyword input area 51. Each of the candidate character strings 541, 542, and 543 is a prefix-match character string for the character string "ap". That is, the candidate character strings 541, 542, and 543 are character strings each having a relevance ratio of the same level with respect to the character string "ap". Accordingly, there may be a case where it is expected to determine which one of such candidate character strings 541, 542, and 543 should be displayed preferentially (i.e., at a higher rank).

In this embodiment, a plurality of candidate character strings used to assist input of a handwritten character are displayed in consideration of the workload (i.e., the labor required for input) of handwriting input to be carried out by the user. In this embodiment, when a plurality of candidate character strings each having a relevance ratio of the same level with respect to a character string in the middle of input are displayed, for example, a character string requiring a more workload (labor) of handwriting input by the user is preferentially displayed. Thereby, it is possible to further reduce the labor for handwriting input by the user, and enhance the convenience of the suggestion function of presenting candidate character strings.

Acquisition of a candidate character string for predictive input in this embodiment will be described below with reference to FIG. 7.

First, when a handwritten stroke "a" 61 used for a search query (keyword) is input, a feature amount 62 is calculated by using stroke data (sequential information) corresponding to the stroke 61. The calculated feature amount 62 is compared with a feature amount corresponding to each of a plurality of candidate character strings included in a suggestion index (handwritten character string data) 63. Further, a projection table 64 in which the plurality of candidate character strings are narrowed and sorted based on the degree of similarity, which corresponds to the comparison result of the feature amounts, is generated. The degree of similarity is expressed by a discrete value based on the similarity between the feature amount 62 of the handwritten stroke 61 and feature amount of strokes constituting the candidate character string.

Furthermore, among the plurality of candidate character strings included in the projection table 64, candidate character strings having the same degree of similarity (similarity of the same level) are rearranged in the order corresponding to the workload required to handwrite each character string. For example, candidate character strings having the same degree of similarity are rearranged in the order corresponding to the number of strokes constituting the candidate character string. In other words, the plurality of candidate character strings are rearranged in the order of higher priority based on the similarity to the handwritten stroke 61 and workload required to handwrite the corresponding candidate character string (for example, the number of strokes). Then, the plurality of rearranged candidate character strings are displayed on the screen.

Figure 8:
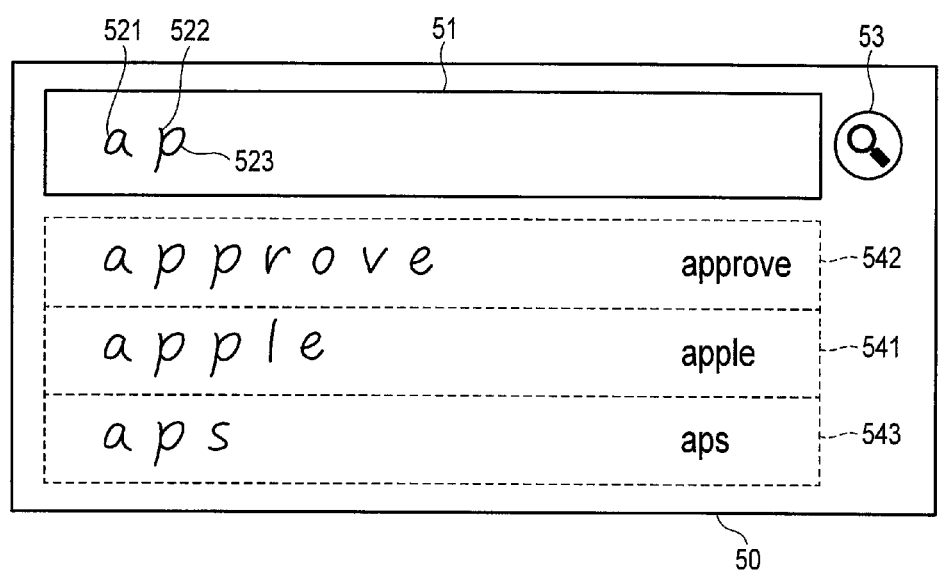
FIG. 8 is a view showing an example in which candidate character strings based on predictive input are displayed by the electronic apparatus of the embodiment on a search screen to which a keyword is to be input by handwriting.

In the example shown in FIG. 8, when the handwritten strokes 521, 522, and 523 (handwritten character string "ap") are input to the keyword input area 51, the candidate character strings 541, 542, and 543 of the character strings in the suggestion index 63 are displayed by using the feature amounts corresponding to the handwritten strokes 521, 522, and 523. These candidate character strings 541, 542, and 543 are, for example, prefix-match character strings with respect to the character string "ap". Further, these candidate character strings 541, 542, and 543 are arranged and displayed in descending order of the workload required for handwriting (for example, the number of strokes), i.e., in the order of "approve" 542, "apple" 541, and "aps" 543. It should be noted that in the area in which the candidate character strings 541, 542, and 543 are displayed, not only handwritten character strings, but also texts corresponding to the handwritten character strings may be displayed. Further, in this area, a value indicative of the workload required for handwriting (for example, the number of strokes, total length of strokes, time required to handwrite strokes, etc.) may be displayed.

As described above, the predictive input utility program 202 has a predictive input function of preferentially displaying a character string requiring a more workload for handwriting input to be carried out by the user when a plurality of candidate character strings used to assist input of a handwritten character string are to be displayed. The predictive input function may be utilized not only in the case where a search keyword is input by handwriting as shown in FIG. 8, but also in all cases where characters are input by handwriting, such as cases where a handwritten document is to be created.

FIG. 9 shows an example of the functional configuration of the predictive input utility program 202. The predictive input utility program 202 carries out display of candidate character strings corresponding to a handwritten character string, overwriting of a handwritten character string with a selected candidate character string, and the like by using sequential information (stroke data) input by an operation using the touch screen display 17.

The predictive input utility program 202 includes, for example, a path display processor 301, a sequential information generator 302, a feature amount calculator 303, a priority calculator 304, a sorting module 305, a candidate display processor 306, a complement display processor 307, a character string data generator 308, a page storage processor 309, a page acquisition processor 310, and a document display processor 311.

The touch screen display 17 is configured to detect occurrence of an event such as a "touch", "move (slide)", "release", and the like. The "touch" is an event indicating that an external object has been brought into contact with the screen. The "move (slide)" is an event indicating that while the external object is in contact with the screen, the contact position has been moved. The "release" is an event indicating that the external object has been released from the screen.

Each of the path display processor 301 and sequential information generator 302 receives an event occurring on the touch screen display 17 such as the "touch", "slide" or "release", thereby detecting a handwriting input operation. The "touch" event includes coordinates of a contact position. The "move (slide)" event includes coordinates of a slide destination. The "release" event includes coordinates of a position at which the external object has been released from the screen. Accordingly, the path display processor 301 and sequential information generator 302 receive coordinates corresponding to a path of movement of the contact position from the touch screen display 17.

The path display processor 301 displays one or more strokes (hereinafter also referred to as a first stroke or first strokes) input by handwriting on the touch screen display 17. The path display processor 301 receives coordinates from the touch screen display 17, and displays paths of the strokes handwritten by a handwriting input operation using the stylus 100 or the like on the screen of the LCD 17A in the touch screen display 17 based on the coordinates. By this path display processor 301, paths of the stylus 100 of the period during which the stylus 100 is in contact with the screen, i.e., strokes are drawn on the screen of the LCD 17A.

The sequential information generator 302 receives the above-mentioned coordinates output from the touch screen display 17, and generates sequential information (stroke data) having the structure described previously in detail with reference to FIG. 3 based on the coordinates. In this case, the sequential information (stroke data), i.e., coordinates and time stamp information corresponding to the points on the strokes may temporarily be stored in a work memory 401.

Further, the sequential information generator 302 outputs the generated sequential information (stroke data) to the feature amount calculator 303. The sequential information generator 302 outputs, for example, each time one stroke is input by handwriting, stroke data corresponding to the stroke to the feature amount calculator 303.

The feature amount calculator 303, priority calculator 304, sorting module 305, and candidate display processor 306 display a plurality of candidates each indicative of one or more handwritten characters in a handwritten document corresponding to handwritten document data 402B. The plurality of candidates are determined by using one or more first strokes displayed on the screen by the path display processor 301 among handwritten character strings in handwritten documents. The document data 402B is stored in a storage medium 402. The feature amount calculator 303, priority calculator 304, sorting module 305, and candidate display processor 306 arranges the plurality of candidates in an order determined by using the number of strokes of each of the plurality of candidates and displays the plurality of arranged candidates.

The storage medium 402 may store handwritten character string data 402A corresponding to a plurality of handwritten character strings included in the handwritten document. The feature amount calculator 303, priority calculator 304, sorting module 305, and candidate display processor 306 display candidates including one or more handwritten characters corresponding to one or more first strokes displayed on the screen by the path display processor 301 among the plurality of handwritten character strings in the order (for example, in descending order of workload) corresponding to the workload required to handwrite one or more strokes constituting each of the candidates (handwritten characters) on the screen by using the handwritten character string data 402A. The handwritten character string data 402A includes a feature amount corresponding to one or more strokes constituting a handwritten character string. By using the handwritten character string data 402A, one or more handwritten character strings each having a feature amount in which the degree of similarity to a feature amount corresponding to the one or more first strokes is greater than or equal to the threshold among the plurality of handwritten character strings are displayed on the screen in the order corresponding to the workload.

More specifically, first the feature amount calculator 303 calculates a feature amount (first feature amount) by using stroke data corresponding to the one or more first strokes generated by the sequential information generator 302. The feature amount calculator 303 calculates a feature amount based on, for example, a shape of one or more first strokes, a handwritten direction out of the strokes, and the like.

Next, the priority calculator 304 calculates a degree of priority (degree of similarity) for each candidate character string by using the calculated first feature amount, and a second feature amount in the handwritten character string data 402A corresponding to the candidate character string.

FIG. 10 shows a configuration example of the handwritten character string data 402A. The handwritten character string data 402A is generated by, for example, analyzing the stroke data and handwritten document data 402B. The handwritten character string data 402A is generated, for example, for each user.

The handwritten character string data 402A includes a plurality of entries corresponding to a plurality of handwritten character strings. Each entry includes, for example, a character string, feature amount, and stroke data. In an entry corresponding to a certain handwritten character string, a "character string" is indicative of text (character codes) corresponding to the handwritten character string. A "feature amount" is indicative of a feature amount corresponding to one or more strokes constituting the handwritten character string. "Stroke data" is indicative of stroke data (sequential information) corresponding to one or more strokes constituting the handwritten character string.

For example, text (character codes) obtained by subjecting, for example, the stroke data indicated by the "stroke data" to character recognition processing is set to the "character string". Further, a feature amount which is based on a shape of a stroke and direction in which the stroke is handwritten and is calculated by using the stroke data indicated by the "stroke data", is set to the "feature amount".

When, for example, the one or more first strokes input by handwriting are strokes constituting an arbitrary character string (for example, a gathering of words, phrases, and the like), and the character string is in the middle of input (i.e., when input of all strokes constituting the character string carried out by handwriting is not completed yet), the priority calculator 304 calculates the degree of similarity of the candidate character string by using a feature amount (first feature amount) corresponding to the one or more first strokes, and feature amount (second feature amount) corresponding to the candidate character string in the handwritten character string data 402A. The priority calculator 304 calculates the degree of similarity corresponding to each of the plurality of candidate character strings in the handwritten character string data 402A.

Further, the sorting module 305 sorts the plurality of candidate character strings in the handwritten character string data 402A in descending order of the calculated degrees of similarity.

FIG. 11 shows an example in which candidate character strings sorted based on the degree of similarity are acquired from the handwritten character string data 402A. Here, a case where one or more first strokes constituting the handwritten character string "app" are input is assumed.

When the one or more first strokes constituting the handwritten character string "app" are input, the priority calculator 304 calculates the degree of similarity to the one or more first strokes "app" for each of the plurality of candidate character strings included in the handwritten character string data 402A as described above. The priority calculator 304 calculates the degree of similarity for each of the candidate character strings indicated by the handwritten character string data 402A by using, for example, the first feature amount corresponding to the one or more first strokes "app", and second feature amount included in each entry of the handwritten character string data 402A. The degree of similarity is expressed by a discrete value based on, for example, the similarity between the first feature amount of the one or more first strokes, and second feature amount of strokes constituting the candidate character string. Further, the sorting module 305 sorts the plurality of candidate character strings in the handwritten character string data 402A in descending order of the calculated degrees of similarity.

As shown in FIG. 11, the candidate character strings of the highest degree of similarity (for example, degree of similarity=6) are, among the plurality of candidate character strings included in the handwritten character string data 402A, for example, the candidate character strings "apple", "approve", "application", and "apply" which are prefix-match character strings for the character string "app". In addition, the candidate character strings of the second highest degree of similarity (for example, degree of similarity=3) are, among the plurality of candidate character strings included in the handwritten character string data 402A, for example, the candidate character strings "aps", and "apricot" which are prefix-match character strings for the character string "ap" (i.e., front two characters of the character string "app").

It should be noted that when the same degree of similarity is set to the plurality of candidate character strings in the handwritten character string data 402A, the plurality of candidate character strings are arranged based on the order of detection from the handwritten character string data 402A, order of storage in the handwritten character string data 402A, and the like.

The sorting module 305 further rearranges the plurality of candidate character strings arranged in descending order of the degree of similarity in descending order of the workload required to handwrite strokes constituting the candidate character string (for example, the number of strokes constituting the candidate character string). This workload is indicated by a value based on at least one of, for example, the number of one or more strokes constituting the character string, sum of lengths of the one or more strokes, number of coordinates (points) expressing the one or more strokes (i.e., number of coordinate data items included in the corresponding stroke data), and time required to handwrite the one or more strokes.

Each of the plurality of candidate character strings includes one or more handwritten characters corresponding to the one or more first strokes ("app") input by handwriting, and handwritten characters not corresponding to the one or more first strokes. For example, the character string "apple" includes one or more handwritten characters "app" corresponding to the one or more first strokes "app", and one or more handwritten characters "le" not corresponding to the one or more first strokes "app". Accordingly, the sorting module 305 may rearrange the plurality of candidate character strings arranged in descending order of the degree of similarity in descending order of the workload required to handwrite the strokes constituting the one or more handwritten characters not corresponding to the one or more first strokes (for example, the number of strokes constituting the candidate character string). That is, the sorting module 305 rearranges the plurality of candidate character strings in descending order of the workload required for the part which is not handwritten yet.

As shown in FIG. 12, the candidate character strings the degree of similarity of which is "6" are rearranged in descending order of the number of strokes constituting the character string, i.e., in the order of "application", "approve", "apply", and "apple". Thereby, the more the workload of a character string required for handwriting input by the user, the higher the character string is ranked. Therefore, it is possible to display the candidate character strings predicted to be input in descending order of effective reduction in the workload required for handwriting to be carried out by the user.

It should be noted that the priority calculator 304 may also calculate the degree of priority into which the degree of similarity of the candidate character string to the one or more first strokes input by handwriting, and a value indicating the workload required to handwrite the strokes constituting the character string are integrated. The priority calculator 304 calculates the degree of priority by, for example, subjecting the degree of similarity, and value indicating the workload to weighted summation. The sorting module 305 sorts the plurality of candidate character strings in the handwritten character string data 402A in descending order of the degree of priority corresponding to the candidate character string. Thereby, like the above-mentioned configuration, it is possible to display the candidate character strings in order of effective reduction in the workload required for handwriting to be carried out by the user.

The candidate display processor 306 displays the rearranged candidate character strings on the screen. The candidate display processor 306 may display the predetermined number of candidate character strings from the top, or may display the candidate character strings the degree of similarity (or the degree of priority) of which is greater than or equal to the threshold. Further, the candidate display processor 306 may arrange the candidate character strings in such a manner that the higher the rank of the candidate character string, the closer to the latest handwriting input position (for example, the last coordinates of the first stroke) the arrangement position of the candidate character string is.

Subsequently, in response to having been selected one candidate character string (hereinafter also referred to as a first candidate character string) from the one or more displayed candidate character strings by the selection operation on the touch screen display 17, the complement display processor 307 display one or more second strokes constituting the first candidate character string on the screen by replacing the one or more first strokes (i.e., strokes constituting the character string in the middle of input) with the one or more second strokes.

More specifically, first, the complement display processor 307 reads the stroke data corresponding to the selected first candidate character string from the handwritten character string data 402A. Further, the complement display processor 307 deletes the one or more first strokes from the screen, and draws the one or more second strokes based on the read stroke data onto the position on which the one or more first strokes have been drawn. Further, the complement display processor 307 may delete the stroke data corresponding to the one or more first strokes from the work memory 401, and may temporarily store the stroke data corresponding to the one or more second strokes in the work memory 401.

The page storage processor 309 stores the generated stroke data (the stroke data temporarily stored in the work memory 401) in the storage medium 402 as handwritten document data 402B. The storage medium 402 is, for example, a storage device in the tablet computer 10.

The page acquisition processor 310 reads already stored arbitrary handwritten document data 402B from the storage medium 402. The read handwritten document data 402B is sent to the document display processor 311. The document display processor 311 analyzes the handwritten document data 402B, and displays a document (page) including a path of each stroke indicated by stroke data (sequential information) on the screen based on the above analysis result.

It should be noted that when the handwriting input of a character string has been completed without any one of the displayed candidate character strings being selected (for example, when the user has input all the strokes constituting the character string by handwriting), the character string data generator 308 generates handwritten character string data 402A (entry of handwritten character string data) corresponding to the character string input of which has been completed. The character string data generator 308 may recognize the characters (text) corresponding to one or more strokes constituting the character string input of which has been completed by carrying out character recognition processing by using a feature amount corresponding to the one or more strokes. The character string data generator 308 generates an entry of handwritten character string data including the recognized characters (text), feature amount and stroke data, and adds the generated entry to the handwritten character string data 402A.

Further, the character string data generator 308 may also generate the handwritten character string data 402A by analyzing the already prepared handwritten document data 402B. For example, if analyzing English handwritten document data 402B, the character string data generator 308 generates text (text data) corresponding to a handwritten character string included in the handwritten document (stroke data corresponding to the handwritten character string) by subjecting the handwritten character string to character recognition processing. Then, the character string data generator 308 detects a word from the generated text, and generates an entry of handwritten character string data 402A for each word.

Further, for example, when analyzing Japanese handwritten document data 402B, the character string data generator 308 generates text (text data) corresponding to a handwritten character string included in the handwritten document (stroke data corresponding to the handwritten character string) by subjecting the character string to character recognition processing. Then, the character string data generator 308 divides the generated text into words (morphemes) by subjecting the text to morphological analysis processing and generates an entry of handwritten character string data 402A for each word.

Thereby, it is possible to generate handwritten character string data 402A from the already prepared handwritten document data 402B.

It should be noted that regarding the displayed handwritten candidate character string, part of the character string thereof may be selected.

Figure 13:
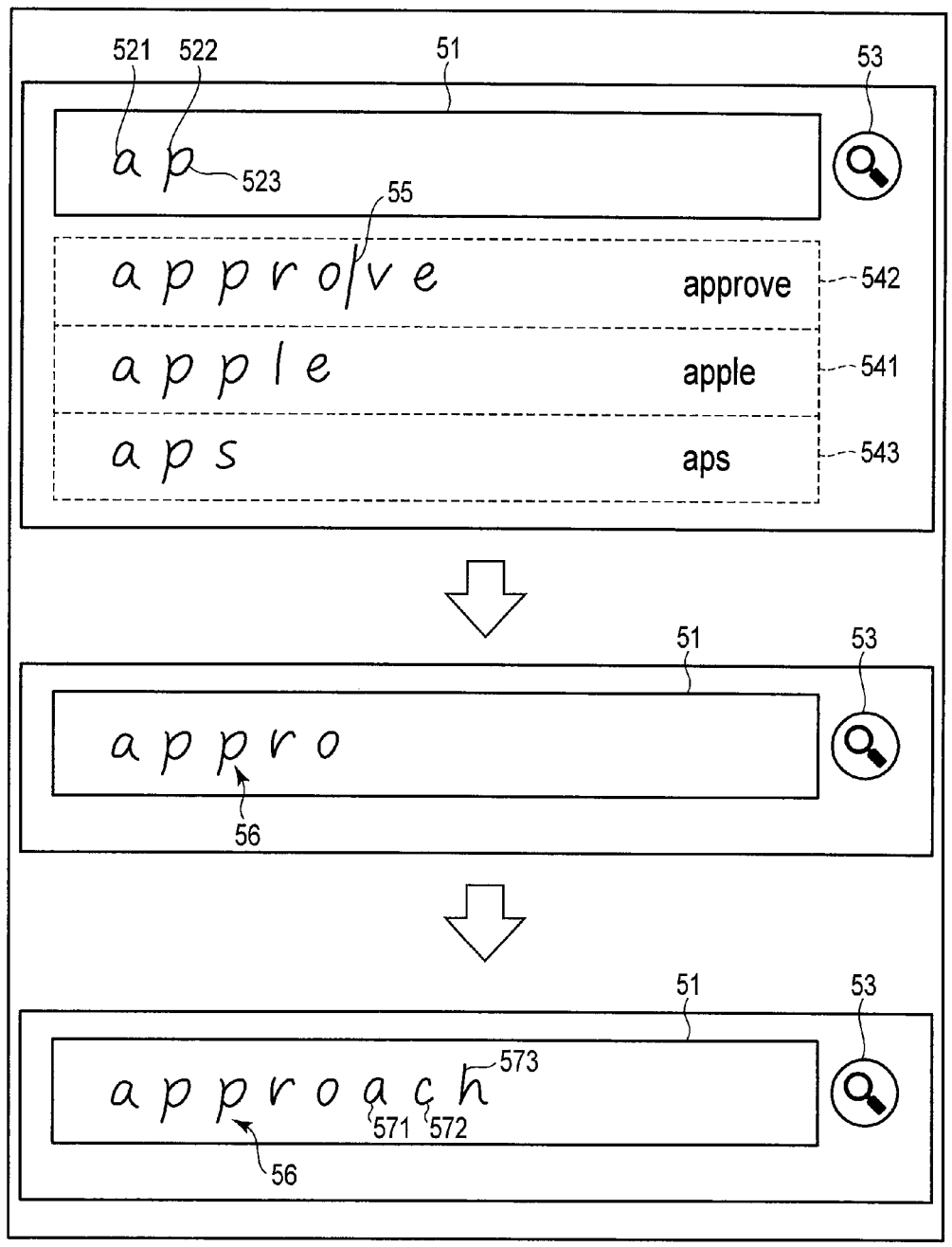
FIG. 13 is a view for explaining an operation of selecting part of a candidate character string by predictive input, and displayed on the search screen of FIG. 8.

FIG. 13 shows an example in which an operation for selecting part of a candidate character string is carried out on a search screen on which candidate character strings are displayed. Here, a case where the user is to input a character string "approach" by handwriting is assumed. In the keyword input area 51, handwritten strokes 521, 522, and 523 (handwritten character string "ap") constituting the character string "approach" have been input up to the middle of the entire part, and candidate character strings 541, 542, and 543 corresponding to the handwritten strokes 521, 522, and 523 are displayed.

The character string "approach" is not included in the candidate character strings 541, 542, and 543, and hence the user carries out a selection operation of inputting only the character string "appro" included in the candidate character string "approve" 542 by utilizing the candidate character string "approve" 542 in which the front five characters coincide with the character string "approach". This selection operation is an operation of designating part of the candidate character string, and is, for example, an operation of interposing a stroke 55 between characters of the candidate character string by handwriting.

In response to the selection operation, the complement display processor 307 detects a character string "appro" in front of the stroke 55 in the area of the candidate character string "approve" 542 in which the stroke 55 is handwritten. Then, the complement display processor 307 displays the character string "appro" 56 in the keyword input area 51 by replacing the handwritten strokes 521, 522, and 523 with the strokes constituting the detected character string "appro".

The user further inputs handwritten strokes 571, 572, and 573 (handwritten character string "ach"), whereby the user can complete the input of the handwritten character string "approach".

As described above, even when no character string completely matching with a character string desired to input is included in the displayed candidate character strings 541, 542, and 543, it is possible to reduce the workload required for handwriting input by utilizing a candidate character string partially matching with the character string desired to input. It should be noted that the above-mentioned selection operation may be any type of operation such as an operation of inputting a stroke surrounding part of a candidate character string by handwriting, operation of tapping a position between characters of the candidate character string, and the like if only the selection operation is an operation which makes it possible to designate part of the candidate character string.

Next, examples of the candidate character string to be displayed during preparation of a handwritten document will be described below with reference to FIGS. 14 to 16.

Figure 14:
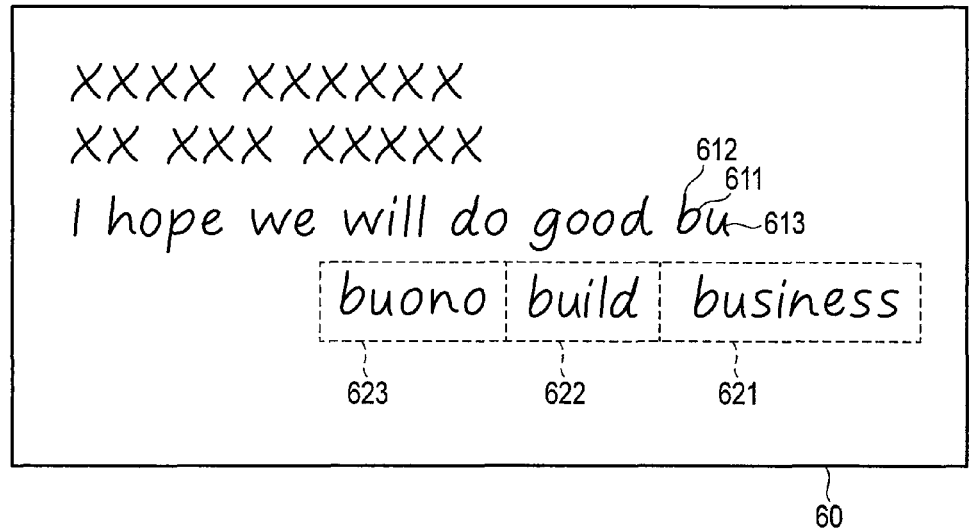
FIG. 14 is a view showing a first example in which candidate character strings by predictive input are displayed in a handwritten document by the electronic apparatus of the embodiment.

In the example shown in FIG. 14, in response to a handwriting input operation carried out by the user, handwritten character strings (strokes) are drawn in a handwritten document 60. For example, in response to a handwriting input operation corresponding to strokes 611, 612, and 613 carried out by the user, a handwritten character string "bu" is drawn in the handwritten document 60.

In response to the handwriting input operation corresponding to the strokes 611, 612, and 613, the candidate display processor 306 displays on the screen candidate character strings "business" 621, "build" 622, and "buono" 623 each having a higher degree of priority (degree of similarity) with respect these strokes 611, 612, and 613. At this time, the candidate display processor 306 arranges the candidate character strings in such a manner that a candidate character string requiring a more workload for input is arranged at a position closer to the strokes 611, 612, and 613. That is, when candidate character strings rearranged based on the degree of similarity based on the feature amount, and workload for input are acquired, the candidate display processor 306 displays the candidate character strings in such a manner that the higher the rank of the candidate character string (i.e., the higher the degree of priority of the candidate character string based on the degree of similarity, and workload), the closer to the latest input strokes 611, 612, and 613 the display position of the candidate character string is.

In the example shown in FIG. 14, the candidate character strings 621, 622, and 623 are arranged from a position close to the strokes 611, 612, and 613 in the order of "business" 621, "build" 622, and "buono" 623 in the horizontal direction.

Figure 15:
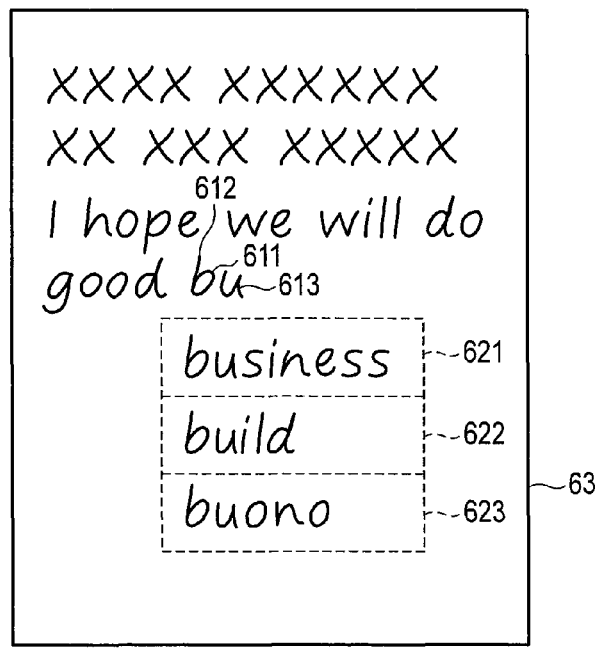
FIG. 15 is a view showing a second example in which candidate character strings by predictive input are displayed in a handwritten document by the electronic apparatus of the embodiment.

Further, as shown in FIG. 15, arrangement of the candidate character strings 621, 622, and 623 may also be determined in consideration of the size or shape of the handwritten document 63. In the example shown in FIG. 15, the candidate character strings 621, 622, and 623 are arranged from a position close to the strokes 611, 612, and 613 in the order of "business" 621, "build" 622, and "buono" 623 in the vertical direction. Further, the candidate character strings 621, 622, and 623 may also be arranged from a position close to the strokes 611, 612, and 613 in a grid-form.

Furthermore, the candidate character strings 621, 622, and 623 may also be displayed in such a manner that the higher the rank of the candidate character string (i.e., the higher the degree of priority of the candidate character string based on the degree of similarity, and workload), the more conspicuously the candidate character string is displayed. For example, the candidate character string of the higher rank is displayed in a more conspicuous color than the candidate character string of the lower rank. Further, for example, the candidate character string of the higher rank is displayed in a larger size than the candidate character string of the lower rank.

In response to a selection operation of selecting one of the displayed candidate character strings 621, 622, and 623 (for example, a tapping operation) carried out by the user, the complement display processor 307 complements the handwritten strokes 611, 612, and 613 by using the selected candidate character string.

Figure 16:
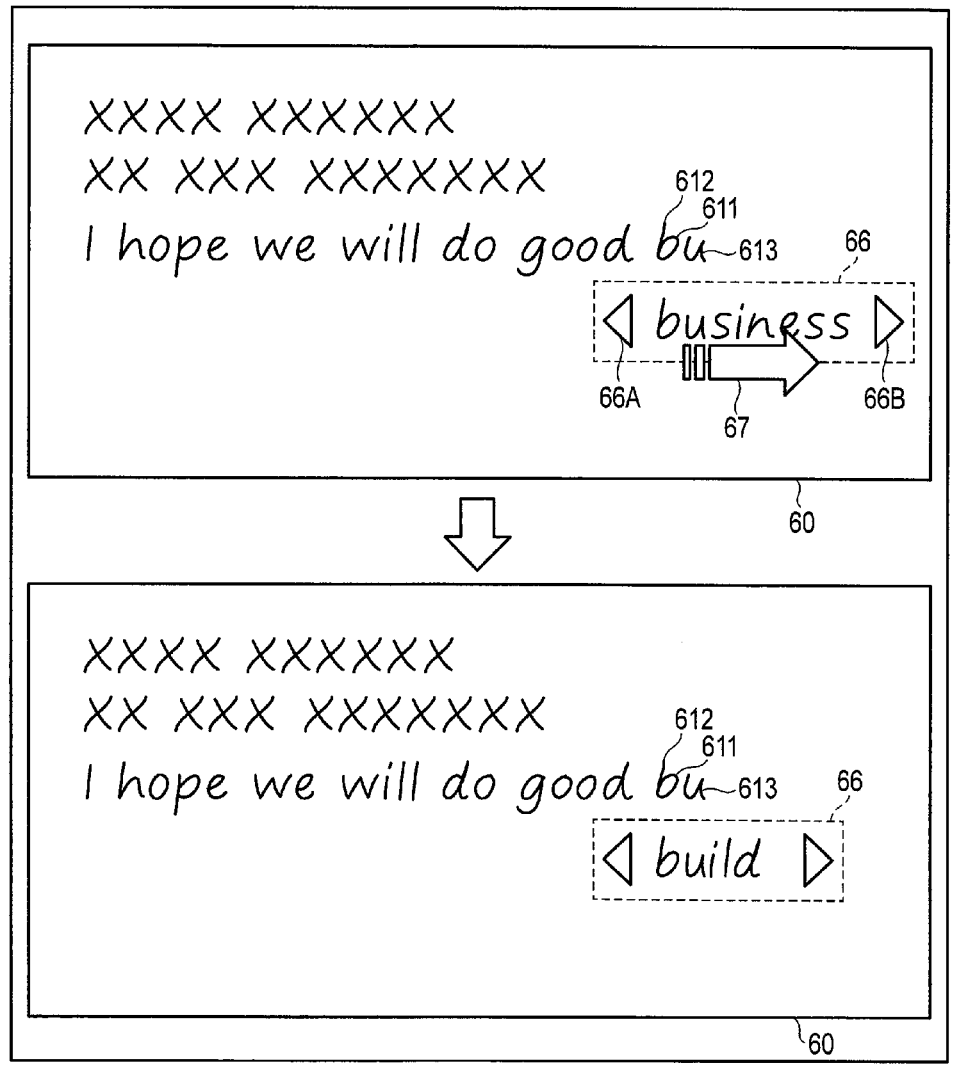
FIG. 16 is a view showing a third example in which candidate character strings by predictive input are displayed in a handwritten document by the electronic apparatus of the embodiment.

Further, as shown in FIG. 16, in response to a scrolling operation on an area on which one candidate character string is displayed, the candidate character strings may be switched in sequence. The candidate display processor 306 displays the candidate character strings in such a manner that for example, in the initial state, the candidate character string of the highest rank (i.e., the candidate character string which is the highest in the degree of priority based on the degree of similarity, and workload) is displayed in the area 66, and the higher the rank of the candidate character string, the less the amount of the scrolling operation for displaying the candidate character string is.

The candidate display processor 306 switches the candidate character string to be displayed in response to a scrolling operation on the area 66 carried out by the user. For example, when the character string "business" is displayed on the area 66, the character string "business" is switched to the character string "build" in response to a scrolling operation from left to right carried out by the user. It should be noted that the candidate display processor 306 may also be configured to switch the candidate character string to be displayed in response to an operation of tapping a button 66A or a button 66B.

Further, in response to a selection operation (for example, a tapping operation) of selecting a candidate character string displayed on the area 66 carried out by the user, the complement display processor 307 complements the handwritten strokes 611, 612, and 613 by using the selected candidate character string.

As described above, a candidate character string requiring a more workload of handwriting (for example, "business") is displayed at a position close to the latest input position. Accordingly, a character string input of which is troublesome for the user is displayed (arranged) more preferentially than a character string input of which is easy for the user, and hence it is possible to enhance the advantage of predictive input utilizing candidate character strings.

Figure 17:
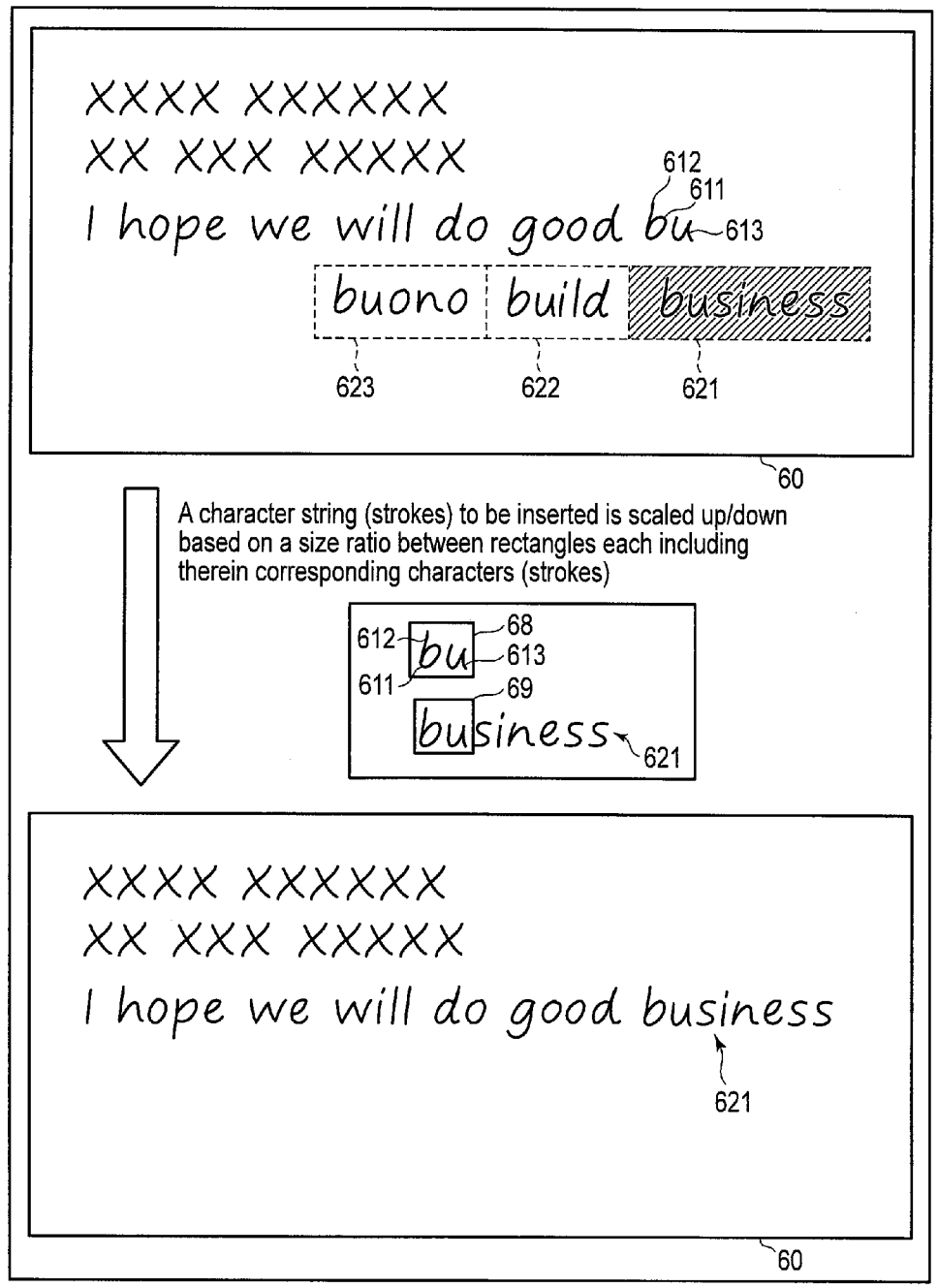
FIG. 17 is a view showing an example in which a character string selected from candidate character strings is drawn in a handwritten document by the electronic apparatus of the embodiment.

Next, FIG. 17 shows an example in which the handwritten strokes 611, 612, and 613 are complemented by using the selected candidate character string. Here, a case where the candidate character string "business" 621 is selected from the candidate character strings 621, 622, and 623 displayed in the handwritten document 60 is assumed.

In response to occurrence of an event indicating that the candidate character string 621 has been selected, the complement display processor 307 detects strokes corresponding to each other between the handwritten strokes 611, 612, and 613, and one or more strokes constituting the character string 621. That is, the complement display processor 307 detects the handwritten strokes 611, 612, and 613, and three strokes constituting "bu" in the character string "business" 621.

Subsequently, the complement display processor 307 determines a rectangle 68 including therein the handwritten strokes 611, 612, and 613, and determines a rectangle 69 including therein three strokes constituting the detected character string "bu". The complement display processor 307 scales up or scales down the character string 621 (i.e., strokes constituting the character string 621) to be inserted in the handwritten document 60 based on a size ratio between the rectangles 68 and 69. Further, the complement display processor 307 replaces the handwritten strokes 611, 612, and 613 in the handwritten document 60 with the scaled up or scaled down handwritten character string 621, thereby displaying the handwritten character string 621 in the handwritten document 60.

Thereby, after carrying out the handwriting input operation of inputting the handwritten strokes "bu" 611, 612, and 613, the user carries out only the selection operation of selecting the candidate character string "business" 621, whereby the character string "business" is drawn in the handwritten document 60, and the workload of the user can be reduced.

Next, an example of the procedure of handwriting input processing executed by the predictive input utility program 202 will be described below with reference to the flowchart of FIG. 18.

The path display processor 301 displays on a document paths (strokes) of movement of the stylus 100 or the like based on the handwriting input operation (block B11). Further, the sequential information generator 302 generates above-mentioned sequential information (stroke data arranged in the sequential order) based on coordinates corresponding to the paths based on the handwriting input operation, and temporarily stores the generated sequential information in the work memory 401 (block B12).

Figure 19:
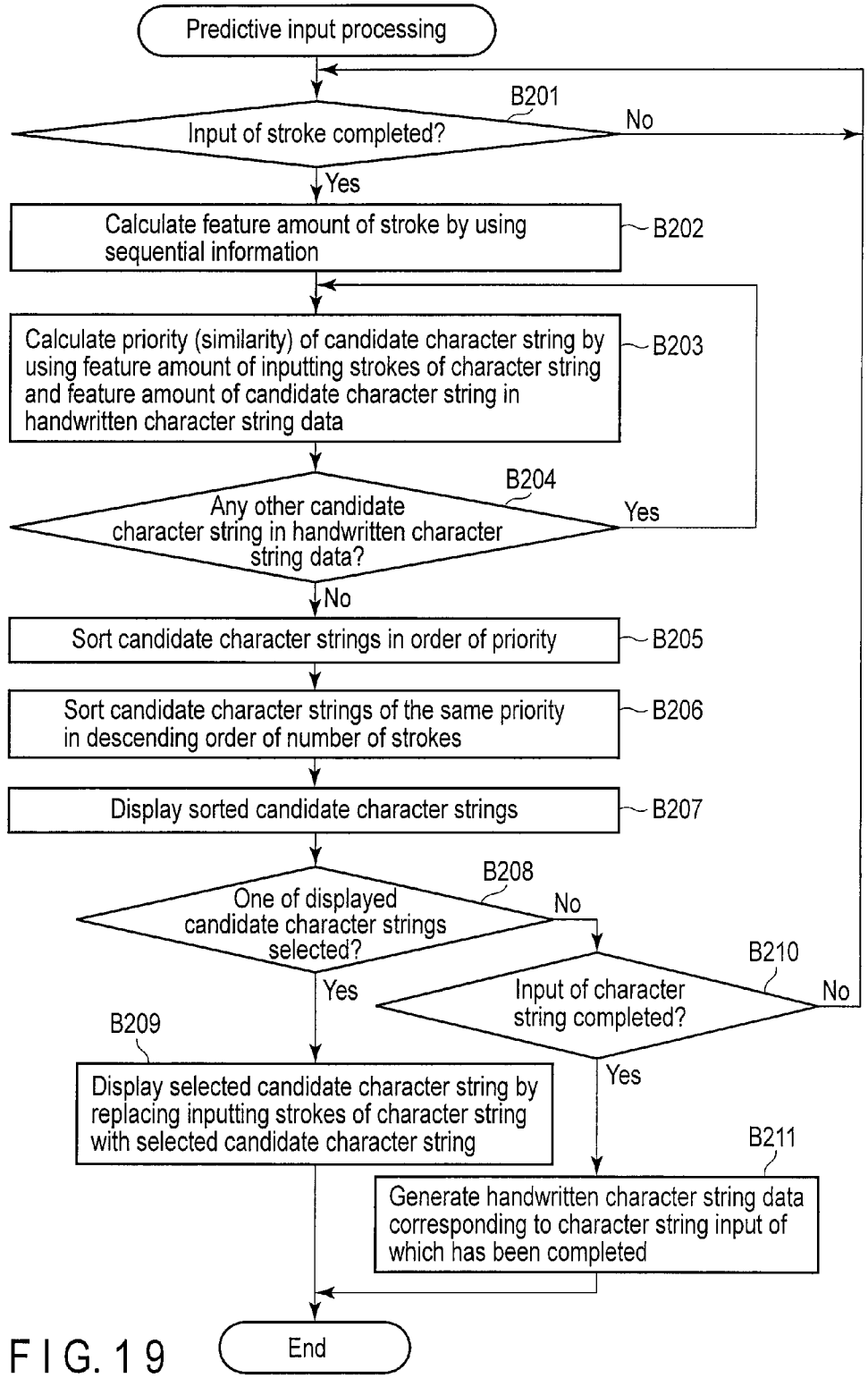
FIG. 19 is a flowchart showing an example of the procedure of predictive input processing executed by the electronic apparatus of the embodiment.

Further, the flowchart of FIG. 19 shows an example of the procedure for handwriting input processing executed by the predictive input utility program 202.

The feature amount calculator 303 determines whether input of one handwritten stroke (first stroke) has been completed (block B201). For example, when stroke data corresponding to the first stroke is received from the sequential information generator 302, the feature amount calculator 303 detects that input of the first stroke has been completed.

When input of the first stroke is not completed yet (No in block B201), the flow is returned to block B201, and the feature amount calculator 303 determines again whether input of the first stroke has been completed.

When input of the first stroke has been completed (Yes in block B201), the feature amount calculator 303 calculates a feature amount by using sequential information (stroke data) which corresponds to the first stroke and is generated by the sequential information generator 302 (block B202). The priority calculator 304 calculates the degree of priority (degree of similarity) of a candidate character string by using the calculated feature amount (first feature amount), and a feature amount (second feature amount) corresponding to the candidate character string in the handwritten character string data 402A (block B203). More specifically, when the first stroke is a stroke constituting a character string (character) in the middle of input, the priority calculator 304 calculates the degree of priority of a candidate character string by using a feature amount (first feature amount) corresponding to one or more handwritten strokes constituting the character string in the middle of input, and a feature amount (second feature amount) corresponding to the candidate character string in the handwritten character string data 402A. The first feature amount includes the calculated feature amount. Further, when the input first stroke is a front stroke constituting the character string, the priority calculator 304 calculates the degree of priority of the candidate character string by using the calculated feature amount (first feature amount), and a feature amount corresponding to the candidate character string in the handwritten character string data 402A. For example, the higher the degree of similarity between the first feature amount and second feature amount, the higher the degree of priority calculated by the priority calculator 304 is.

Subsequently, the priority calculator 304 determines whether an entry of any other candidate character string (i.e., entry of a candidate character string the degree of priority of which is not calculated yet) is included in the handwritten character string data 402A (block B204). When an entry of the other candidate character string is included in the handwritten character string data 402A (Yes in block B204), the flow is returned to block B203, and the priority calculator 304 calculates the degree of priority of the candidate character string.

When no entry of the other candidate character string is included in the handwritten character string data 402A, i.e., when the degrees of priority of all the candidate character strings have been calculated (Yes in block B204), the sorting module 305 rearranges the candidate character strings in descending order of the degree of priority (block B205). Furthermore, the sorting module 305 rearranges a plurality of candidate character strings of the same degree of priority among the rearranged candidate character strings in descending order of the number of strokes constituting the candidate character string (block B206). Further, the candidate display processor 306 arranges and displays the candidate character strings in the order corresponding to the number of strokes constituting each of the candidate character strings (block B207). For example, the higher the rank of the candidate character string, the closer to the latest handwriting input position (for example, the last coordinates of the first stroke) does the candidate display processor 306 arrange the candidate character string at a position.

Subsequently, the complement display processor 307 determines whether one character string has been selected from the displayed candidate character strings by a selection operation on the touch screen display 17 (block B208).

When one character string has been selected from the displayed candidate character strings (Yes in block B208), the complement display processor 307 displays one or more handwritten strokes corresponding to the selected candidate character string by replacing the one or more handwritten strokes corresponding to the character string in the middle of input displayed on the screen with the one or more handwritten strokes corresponding to the selected candidate character string by using stroke data corresponding to the selected character string (block B209).

On the other hand, when no character string has been selected from the displayed candidate character string (No in block B208), the character string data generator 308 determines whether input of the character string in the middle of input has been completed by the input of the first stroke (block B210). When the input of the character string has not been completed yet (No in block B210), the flow is returned to block B201, and processing for displaying a candidate character string in which a handwritten stroke to be newly input is taken into consideration is executed. Further, when input of the character string has been completed already (Yes in block B210), the character string data generator 308 generates handwritten character string data 402A (entry of the handwritten character string data) corresponding to the character string input of which has been completed since the handwriting input of the strokes corresponding to the character string has been completed without utilizing predictive input using the candidate character string (block B211).

It should be noted that the predictive input utility program 202 may be utilized in cooperation with all the types of software (for example, web browser, mailer, word processing software, spreadsheet software, and the like) by which characters are input by handwriting.

As described above, according to this embodiment, it is possible to effectively present candidate character strings predicted to be input. The path display processor 301 displays one or more first strokes input by handwriting on the screen of the touch screen display 17. The candidate display processor 306 displays on the screen a plurality of candidates each including one or more handwritten characters corresponding to the one or more first strokes among a plurality of handwritten character strings in a handwritten document. The plurality of candidates are arranged and displayed in the order based on the number of strokes constituting each of the plurality of candidates.

Thereby, it is possible to further reduce the labor required for handwriting input to be carried out by the user, and enhance the convenience of the suggestion function of presenting candidate character strings.

It should be noted that all the processing procedures of this embodiment described in the flowcharts of FIGS. 18 and 19 can be executed by software. Accordingly, by only installing the program for executing the processing procedure onto a normal computer through a computer-readable storage medium storing therein the program, and executing the program, it is possible to easily realize the same advantage as this embodiment.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising a display processor configured to display one or more first strokes on a screen,
   wherein the display processor is configured to display one or more candidates of a plurality of candidates on the screen based on a feature amount corresponding to strokes constituting each of the plurality of candidates, the plurality of candidates each indicative of one or more handwritten characters in a handwritten document, the plurality of candidates retrieved from the handwritten document by using the one or more first strokes, the one or more candidates each having the feature amount of which a degree of similarity to the feature amount corresponding to the one or more first strokes is greater than or equal to a threshold, and
   is configured to arrange the one or more candidates each having a priority based on the degree of similarity and number of strokes of each of the one or more candidates in such a manner that a candidate of the one or more candidates having a higher degree of priority is arranged at a position closer to a latest input stroke of the one or more first strokes, and to display the one or more arranged candidates.

2. The electronic apparatus of claim 1, wherein each of the plurality of candidates comprises a handwritten character string comprising one or more handwritten characters corresponding to the one or more first strokes, and one or more handwritten characters not corresponding to the one or more first strokes, and
   the one or more candidates are arranged in a descending order of the number of strokes of the one or more handwritten characters not corresponding to the one or more first strokes and the one or more arranged candidates are displayed.

3. The electronic apparatus of claim 1, wherein the display processor is configured to display, in response to a selection of a first candidate from the one or more displayed candidates, one or more second strokes constituting the first candidate by replacing the one or more first strokes with the one or more second strokes, on the screen.

4. The electronic apparatus of claim 1, wherein the one or more candidates are further arranged in an order corresponding to at least one of the number of strokes of each of the one or more candidates, a sum of lengths of strokes of each of the one or more candidates, number of coordinates expressing strokes constituting each of the one or more candidates, and time required to handwrite strokes constituting each of the one or more candidates, and the one or more arranged candidates are displayed.

5. A method comprising:
   displaying one or more first strokes on a screen,
   wherein the displaying comprises displaying one or more candidates of a plurality of candidates on the screen based on a feature amount corresponding to strokes constituting each of the plurality of candidates, the plurality of candidates each indicative of one or more handwritten characters in a handwritten document, the plurality of candidates retrieved from the handwritten document by using the one or more first strokes, the one or more candidates each having the feature amount of which a degree of similarity to the feature amount corresponding to the one or more first strokes is greater than or equal to a threshold,
   arranging the one or more candidates each having a priority based on the degree of similarity and number of strokes of each of the one or more candidates in such a manner that a candidate of the one or more candidates having a higher degree of priority is arranged at a position closer to a latest input stroke of the one or more first strokes, and
   displaying the one or more arranged candidates.

6. The method of claim 5, wherein each of the plurality of candidates comprises a handwritten character string comprising one or more handwritten characters corresponding to the one or more first strokes, and one or more handwritten characters not corresponding to the one or more first strokes, and
   the one or more candidates are arranged in a descending order of the number of strokes of the one or more handwritten characters not corresponding to the one or more first strokes and the one or more arranged candidates are displayed.

7. The method of claim 5, further comprising displaying, in response to a selection of a first candidate from the one or more displayed candidates, one or more second strokes constituting the first candidate by replacing the one or more first strokes with the one or more second strokes, on the screen.

8. The method of claim 5, wherein the one or more candidates are further arranged in an order corresponding to at least one of the number of strokes of each of the one or more candidates, a sum of lengths of strokes of each of the one or more candidates, number of coordinates expressing strokes of each of the one or more candidates, and time required to handwrite strokes constituting each of the one or more candidates, and the one or more arranged candidates are displayed.

9. A computer-readable, non-transitory storage medium having stored thereon a program which is executable by a computer, the program controlling the computer to execute functions of
   displaying one or more first strokes on a screen,
   wherein the displaying comprises displaying one or more candidates of a plurality of candidates on the screen based on a feature amount corresponding to strokes constituting each of the plurality of candidates, the plurality of candidates each indicative of one or more handwritten characters in a handwritten document, the plurality of candidates retrieved from the handwritten document by using the one or more first strokes, the one or more candidates each having the feature amount of which a degree of similarity to the feature amount corresponding to the one or more first strokes is greater than or equal to a threshold,
   arranging the one or more candidates each having a priority based on the degree of similarity and number of strokes of each of the one or more candidates in such a manner that a candidate of the one or more candidates having a higher degree of priority is arranged at a position closer to a latest input stroke of the one or more first strokes, and
   displaying the one or more arranged candidates.

10. The storage medium of claim 9, wherein each of the plurality of candidates comprises a handwritten character string comprising one or more handwritten characters corresponding to the one or more first strokes, and one or more handwritten characters not corresponding to the one or more first strokes, and the one or more candidates are arranged in a descending order of the number of strokes of the one or more handwritten characters not corresponding to the one or more first strokes and the one or more arranged candidates are displayed.

11. The storage medium of claim 9, wherein the program controlling the computer to further execute functions of displaying, in response to a selection of a first candidate from the one or more displayed candidates, one or more second strokes constituting the first candidate by replacing the one or more first strokes with the one or more second strokes, on the screen.

12. The storage medium of claim 9, wherein the one or more candidates are further arranged in an order corresponding to at least one of the number of strokes of each of the one or more candidates, a sum of lengths of strokes of each of the one or more candidates, number of coordinates expressing strokes constituting each of the one or more candidates, and time required to handwrite strokes constituting each of the one or more candidates, and the one or more arranged candidates are displayed.

\* \* \* \* \*